May 13, 1958     T. W. KENYON     2,834,117
PENDULUM CONSTRUCTION
Filed Nov. 1, 1955     2 Sheets—Sheet 1
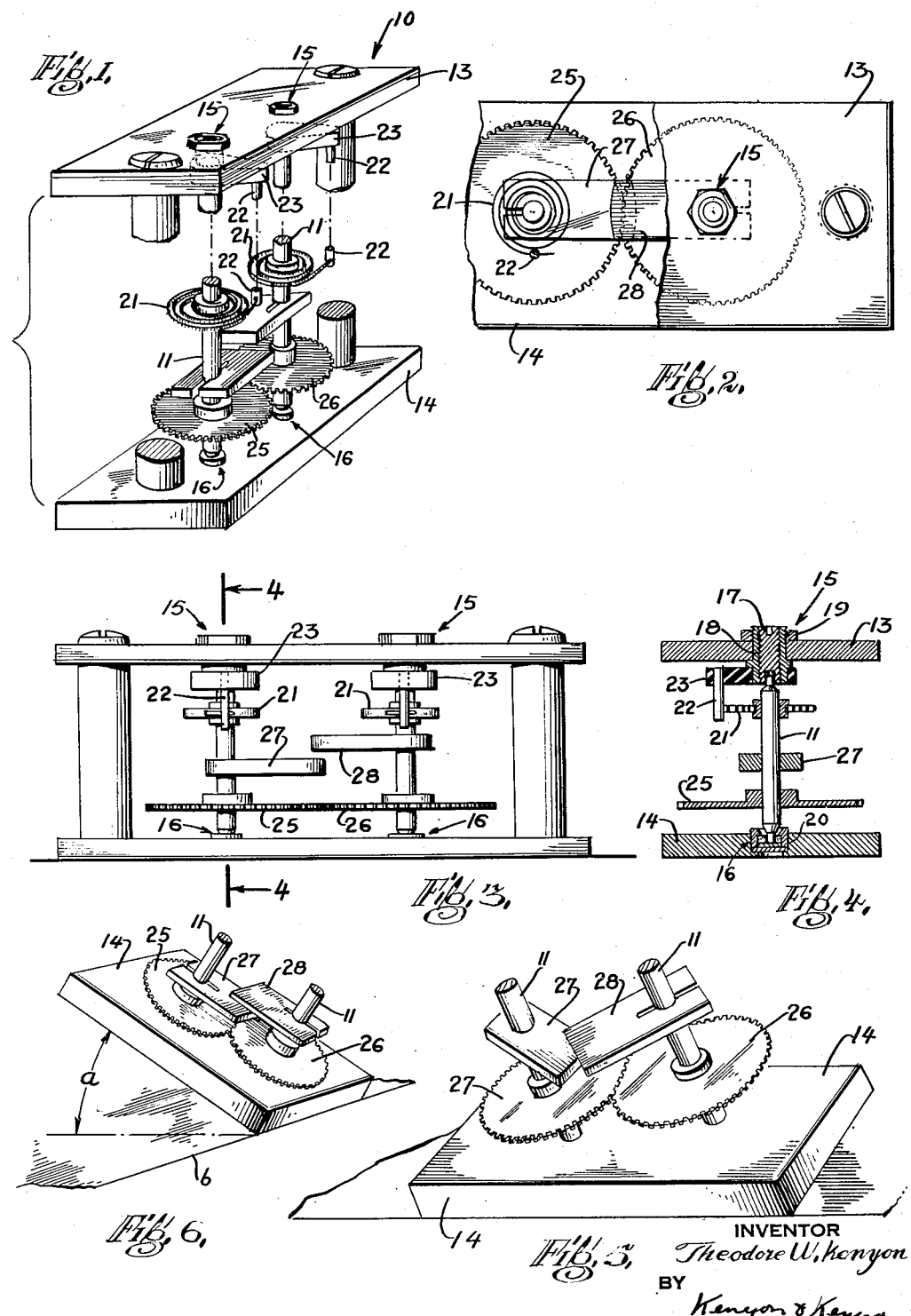
INVENTOR
Theodore W. Kenyon
BY
Kenyon & Kenyon
ATTORNEYS May 13, 1958 T. W. KENYON 2,834,117
PENDULUM CONSTRUCTION
Filed Nov. 1, 1955 2 Sheets-Sheet 2
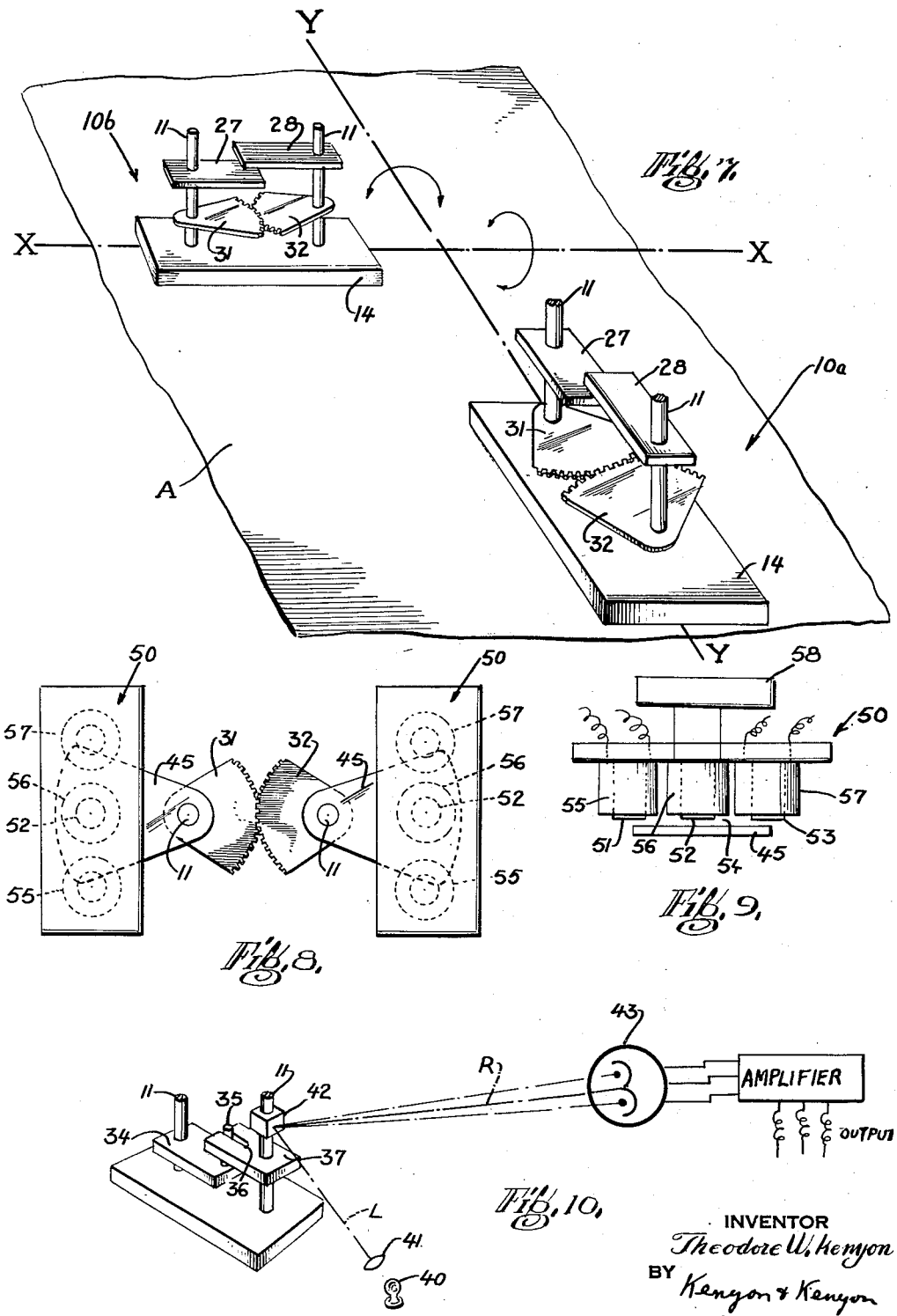

United States Patent Office 2,834,117
Patented May 13, 1958

2,834,117

PENDULUM CONSTRUCTION

Theodore W. Kenyon, Old Lyme, Conn.

Application November 1, 1955, Serial No. 544,189

5 Claims. (Cl. 33—215)

This invention relates to a compensated pendulum construction adapted for use in, for example, the stabilization of vehicles such as aircraft or of missiles about one axis only.

The pendulum construction is adapted particularly for sensing tilt about a horizontal axis in a single plane and is relatively insensitive to tilting actions about other axes.

The invention contemplates the use of pick-off means in conjunction with the pendulum arrangement whereby sensing motion of the pendulum construction in response to tilt may be converted into a signal transmittable, for example, through an electric circuit to appropriate correcting mechanism designed, for example, to counteract the tilt causing the sensing response in the pendulum construction.

Among the objects and features of the invention are the provision of pendulum sensing mechanisms of the type mentioned for providing stabilization of a moving body or vehicle about one axis irrespective of the angle of other axes. A camera may be stabilized on one axis only, in, for instance, a fighter type airplane.

Occasions frequently arise where a vertical reference is required especially when two axes are separately stabilized. Such vertical reference can be secured by the use of a gyro vertical or rate stabilized system whose operation is controlled by compensated pendulum constructions embodying the instant invention utilized as vertical sensing units separately for each of the two axes. This use is contemplated among the objects and features of this invention.

Further objects and features of the invention are the provision of a pendulum type sensing device which includes a pair of pendulums and means for coupling the two pendulums together so as to provide mutual interaction on both by gravitational and other forces affecting each pendulum individually. The invention also contemplates use of means for deriving signals from the net motion of the pendulum system resulting from said mutual interaction.

Other objects and features of the invention are the provision of extremely simple and effective mechanical construction of the compensated pendulum construction embodying the invention.

Other objects and features of the invention will become apparent from the following specification and the accompanying drawings, wherein:

Figure 1 is an exploded perspective view of a compensated pendulum construction embodying the invention;

Fig. 2 is a partially broken away plan view of the device of Fig. 1;

Fig. 3 is a front elevational view of the device of Fig. 1;

Fig. 4 is a vertical section taken along the plane of line 4—4 of Fig. 3 and viewed in the direction of the arrows;

Fig. 5 illustrates in diagrammatic manner the responsive sensing movement of the device when a tilt occurs about the horizontal axis in the plane in which the device is intended to be sensitive;

Fig. 6 similarly illustrates the non-responsive condition of the device when tilt occurs on other axes than the one in which the device is sensitive;

Fig. 7 illustrates diagrammatically the application of a pair of independently sensitive pendulum devices each embodying the invention for separate tilt responsive sensing action in a different one of a pair of different axes;

Fig. 8 is a plan view of a modified tilt sensitive pendulum construction embodying the invention combined with an electromagnetic type of tilt signal pick-off means;

Fig. 9 is a fragmentary elevational view seen from the right of Fig. 8 and illustrating further details of the tilt signal pick-off means of Fig. 8; and Fig. 10 is a fragmentary perspective view of a further modified form of the pendulum construction combined with reflected light type of tilt signal pick-off means.

Referring to the drawings and first to Figures 1 to 4 inclusive, the reference character 10 denotes generally a compensated pendulum construction embodying the invention. The arrangement illustrated includes a pair of parallelly disposed shafts or pintles 11. The shafts or pintles are supported rotatively between parallel frame parts 13 and 14 by the low friction bearings 15 and 16. Each bearing 15 includes the jewel carrying set screw 17 which is threadedly adjustable within a bushing 18. The bushing 18 is secured to the frame part 13 as by a clamping nut 19.

Each fixed jewel bearing 16 is mounted in the frame part 14, for example, by a press fit in an opening 20 therein. The two shafts 11 are thus borne in rotative low friction manner each between a pair of low friction bearings 15 and 16.

The two shafts 11 are provided with independent spring restraining means in the form, for example, of a hair spring 21 similar to the spring conventionally used with the balance wheel of a watch. One end of a hair spring 21 is fixed to a shaft or pintle 11 and the other or outer end of each such spring 21 is adjustably secured in conventional manner to a fixed pin member 22. The pin members 22 are each conveniently carried by a separate adjustable support 23 mounted on a bearing 18.

Intermeshing gears 25 and 26 of like dimensions and having like number of teeth are fixed respectively to the two shafts 11. Other means of rotatively coupling the pair of shafts 11 together may be employed.

An elongated pendulum weight 27 of symmetrical shape relative to its longitudinal center line is secured to one shaft or pintle 11 so as to extend laterally therefrom. The weight 27 is disposed eccentrically on the shaft with its center of gravity lying between the two shafts 11. An identically dimensioned and shaped pendulum weight 28 is similarly secured to the other shaft or pintle 11 to extend laterally therefrom. This weight 28 is disposed eccentrically on its shaft 11 and with its center of gravity also lying between the two shafts 11. In other words, the heavier portions of the two weights 27 and 28 extend in opposite directions from their respective shafts and toward each other.

The tensions on the restraining springs 21 of the two shafts or pintles 11 are adjusted to provide equal restraint on each shaft. When the common plane containing the axes of the two shafts or pintles 11 is vertical the longitudinal center lines of the horizontally projecting weights 27 and 28 are linearly aligned and the heavier portions of the two weights project toward each other in the manner indicated in Figs. 1–3 inclusive. Since the gears 25 and 26 are intermeshed one of the two restraining springs 21 may be omitted. It is preferable, however, to utilize a separate restraining spring 21 for each shaft 11 because lighter springs can then be used.

As is seen in Fig. 5, any tilt or departure from vertical of the vertical plane common to and containing the axes of the two pintles or shafts 11 about a horizontal axis within said plane will cause gravitational forces to act upon the pendulum weights 27 and 28 and to swing them out of their described alignment and generally in the direction of the tilt and in consonance with the extent of tilt. The gravitational forces exerting swing tendencies on each of the two weights 27 and 28 independently about the axes of their respective shafts 11 upon the occurrence of such tilts of said vertical plane are transmitted from the shaft carrying one of the weights through the meshed gears 25 and 26 to the shaft supporting the other of the two weights. In other words, the mechanical coupling of the two pendulums provides mutual interaction on both pendulums of the gravitational forces affecting each pendulum individually. In consequence, the gear coupled system is extremely sensitive to and responsive to the minutest of tilts of said vertical plane about a horizontal axis lying within said plane.

Any tilt, however, of the coupled pendulums about any other axis will cause swinging of the pendulums only in proportion to the horizontal vector component in the plane of their parallel pivot axes, and unless there is some horizontal vector component in the plane of their parallel axes they will tend to retain the linear alignment of their longitudinal center lines of symmetry as is illustrated in Fig. 6. As is seen in that figure, by way of example, the system has been tilted to an angle $a$ about an axis $b$ which is perpendicular to the common plane containing the axes of the shafts or pintles 11. In this position the gravitational forces on the pendulum weight 28 tend to cause the latter to swing with its shaft 11 to a position diametrically opposite to that shown. At the same time, however, the gravitational forces on the pendulum weight 27 tend to retain the weight 27 in the position shown in Fig. 6. Since the two shafts 11 of the two pendulum weights are coupled together through the gears 25 and 26 the turning tendency of pendulum 28 is counteracted by the equal and oppositely directed tendency of pendulum weight 27 to remain stationary. In consequence, both pendulums 27 and 28 remain unmoved and in the position shown in Fig. 6. The same swing preventing counteraction of each of the coupled pendulums upon the other pendulum of the pair occurs at all angles of tilt of the coupled pair of pendulums on any axis except a tilt or component of tilt of the device in the plane common to the axes of the two shafts 11 about a horizontal axis within said plane only. The sensitivity of the device is limited to tilt or that component of tilt which lies in one plane only. The device thus has maximum sensitivity to tilting in one particular plane. This makes it useful for control purposes as will be presently described.

Since sensing swing of the pendulums begins almost immediately upon even the slightest tilt of the common plane and corrective signals can be immediately transmitted as a result of such tilts, the angular extent of swing of the pendulums is usually small. It is not necessary for most purposes therefore that gears 25 and 26 be complete. Identical and meshing gear segments 31 and 32 as seen in Fig. 7 may replace respective gears 25 and 26 of Figs. 1–4. The other components of the two compensated pendulum systems 10a and 10b shown in Fig. 7 are each identical with the system 10 of Figs. 1–4 inclusive. In Fig. 7, the pendulum system 10a is positioned in the horizontal plane A to sense tilt about the axis Y—Y while the pendulum system 10b is positioned in said plane A to detect tilt about the axis X—X. The two pendulum systems 10a and 10b are, however, entirely independent of each other. Each senses tilt about a different axis and sensing signals can be derived therefrom as will be described to effect stabilization separately about each distinct axis Y—Y and X—X.

As an alternative for complete or segmentally geared coupling of the pendulum shafts 11, the two pendulum weights carried by shafts 11 may be coupled directly together as is illustrated in Fig. 10 as by a pin and slot arrangement, the pendulum weight 34 on one shaft 11, for example, having a pin 35 extending therefrom and engaging in a slot 36 in the pendulum weight 37 on the other shaft 11. The respective weights 34 and 37 are arranged on shafts 11 in the same way as were weights 27 and 28. The two weights 34 and 37 are dimensioned so as to be in balance with their respective centers of gravity at like distances from their respective supporting shaft axes and lying in the respective longitudinal center lines of symmetry of the said weights 34 and 37. The pin and slot coupling between the two weights 34 and 37 provide the same effect as is provided by the gear coupling of Figs. 1–4 inclusive, or segmental gear coupling of Fig. 7 on the occurrence of tilts.

The sensitive motion away from neutral of the pendulum weights 27 and 28 or 34 and 37 on occurrence of tilt can be utilized to transmit signals for causing operation of appropriate mechanisms to counteract the tilt. For example, as shown in Fig. 10, an incident beam L of light from a light source 40 may be focused as by a lens 41 onto a plane reflecting surface 42 provided on one of the pendulum shafts 11. A twin unit photo tube 43 is arranged in the path of light beam R that is reflected from the surface 42. The tube 43 is so positioned that in the neutral position of the weights the reflected beam R is centered relative to the two light sensitive units of the photo tube 43 without affecting either. Any rotary movement of the shaft 11 causes a corresponding shift of the reflected beam R relative to its centralized or neutral position and into one or the other of the light sensitive units of the twin photo tube 43, with consequent photoelectric operation of that one of the units into which the reflected beam R is shifted. The respective light sensitive units are connected through a conventional type of appropriate electronic amplifier and the output of the amplifier is connected to correcting mechanism (not shown) or to any other desirable type of mechanism (not shown), for example, to recording mechanism or the like that is responsive to the electric signals initiated by the reflected beam as a result of swing movements of the pendulums from neutral position when tilt occurs on the specific axis to which the pendulum system is sensitive.

Another arrangement for deriving tilt signals is by the provision of electromagnetic field type pick-off mechanisms. In such an arrangement, for example, as seen in Fig. 8, the shafts 11 are provided, respectively, with equally dimensioned oppositely directed fan-like blades 45 fixed thereto. These blades extend laterally on their shafts 11 and being of like dimensions, shape and weight, counterbalance each other because of th geared coupling between gear segments 31 and 32. These fan-like blades 45 constitute portions of the independent electromagnetic pick-off mechanisms and each cooperates with a substantially E-shaped magnetic core 50. Each core 50 is positioned appropriately in a fixed manner with its three parallel core legs 51, 52, 53 extending perpendicularly and downwardly toward the upper surface of one of the blades 45 but with their outer ends terminating at a selected level above said surface and leaving a gap 54. Electrical coils 55, 56 and 57 are mounted on the respective core legs 51, 52 and 53.

The coil 56 of each center core leg 52 is adapted to receive energizing current from an exciter source of conventional type, for example, a 400 cycle A. C. exciter 58, for the purposes of energizing the magnetic cores 50 and establishing electromagnetic fields extending from the legs 51, 52 and 53 in which the fan-shaped blades 45 are swung when pendulum swinging tilt occurs.

In neutral or non-swung position of the pendulums 27 and 28, the fan-like blades 45 lie beneath and centrally disposed relative to the respective center core legs 52. At this time the distribution of magnetic fields in the gap 54 under the core leg members 51, 52 and 53 is uniform. Any swing or shift, however, of a blade 45 on its pintle 11 either clockwise or counterclockwise changes the magnetic field distribution in the gap 54 between the ends of the core legs and the blade 45 and consequently induces electric currents of different magnitudes in the outer leg coils 55 and 57. The induced currents in these coils resulting from such swing of the blades 45 (initiated by swing of the pendulum weights 27 and 28) is transmitted from the coils through appropriate amplifiers (not shown) to actuate restorative mechanism and cause a re-positioning of the pendulums in neutral condition or to actuate appropriate recording mechanisms or other apparatus.

When the coils 56 are energized by the exciter, the electromagnetic fields established additionally act upon the blades 45 so that electromagnetic forces result which tend to remove most of the weight of the blades and pendulums from the bearings that mount their supporting shafts 11.

The uses for the compensated pendulum systems herein described are numerous and varied. Such pendulum systems may be employed for many purposes besides those hereinbefore specifically mentioned. Likewise, the type signal pick-off means associated therewith may be other than those described.

While specific embodiments of the invention have been described variations in structural detail within the scope of the appended claims is possible and is contemplated. There is no intention therefore of limitation to the exact details shown and described.

What I claim is:

1. A pendulum type sensing device of the character described comprising a pair of like pendulums, means to support each pendulum rotatively about an independent parallel axis so that the two pendulums extend toward each other from their respective axes, gear means for coupling the two pendulums to provide mutual interaction on both by gravitational forces affecting each pendulum individually and spring restraint means for the pendulums.

2. A pendulum type sensing device of the character described comprising a pair of like pendulums, means to support each pendulum rotatively about an independent parallel axis so that the two pendulums extend toward each other from their respective axes, and segmental gear means for coupling the two pendulums to provide mutual interaction on both by gravitational forces affecting each pendulum individually.

3. A pendulum type sensing device of the character described comprising a pair of like pendulums, means to support each pendulum rotatively about an independent parallel axis so that the two pendulums extend toward each other from their respective axes, and pin and slot coupling means for the two pendulums to provide mutual interaction on both by gravitation forces affecting each pendulum individually.

4. A sensing device of the character described comprising a pair of individually swingable identical weights supported eccentrically for individual rotation about respective parallelly disposed axes so that the two weights extend toward each other from their respective axes, and means for mechanically coupling the two weights to provide mutual interaction on both weights by gravitational forces affecting each weight individually.

5. A compensated pendulum type sensing device of the character described comprising a pair of parallelly disposed rotative shafts, bearing means for supporting said shafts, a pair of identical pendulum weights extending toward each other and supported eccentrically each by one of the shafts, spring restraint means for the shafts and coupling means for the shafts, said coupling means serving to provide mutual interaction on both shafts by gravitational forces affecting each pendulum weight individually and thereby to prevent rotative displacement of the pendulums relative to a neutral position thereof except when the plane common to both shaft axes is tilted about a horizontal axis lying within said plane.

References Cited in the file of this patent

UNITED STATES PATENTS

| 2,045,191 | Kreidler | June 23, 1936 |
| 2,445,517 | Dilks | July 20, 1948 |
| 2,572,766 | Rylsky | Oct. 23, 1951 |
| 2,598,552 | Jansen | May 27, 1952 |

FOREIGN PATENTS

| 120,275 | Great Britain | Nov. 7, 1918 |
| 376,249 | Great Britain | July 5, 1932 |
| 378,450 | Italy | Feb. 9, 1940 |